Oct. 2, 1962  R. DAUB  3,056,392
INTERNAL COMBUSTION ENGINES
Filed June 3, 1959  11 Sheets-Sheet 1
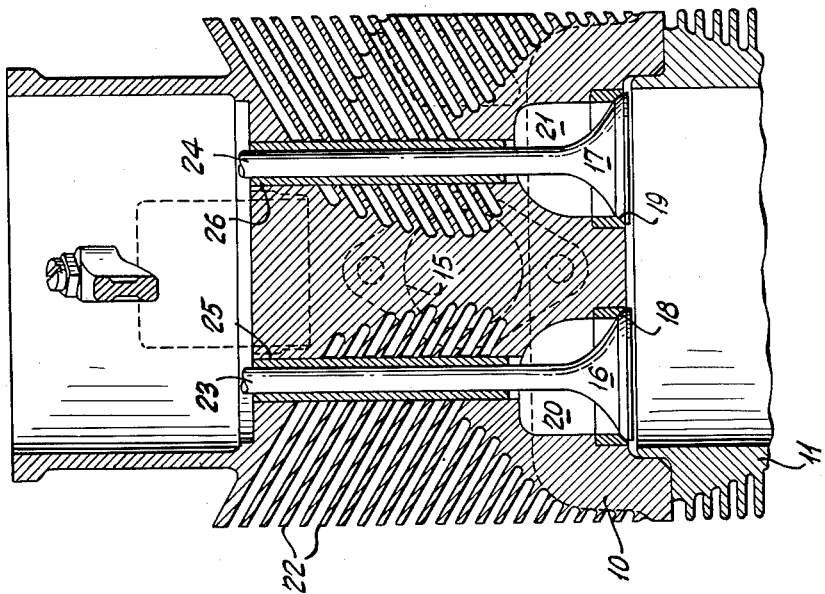
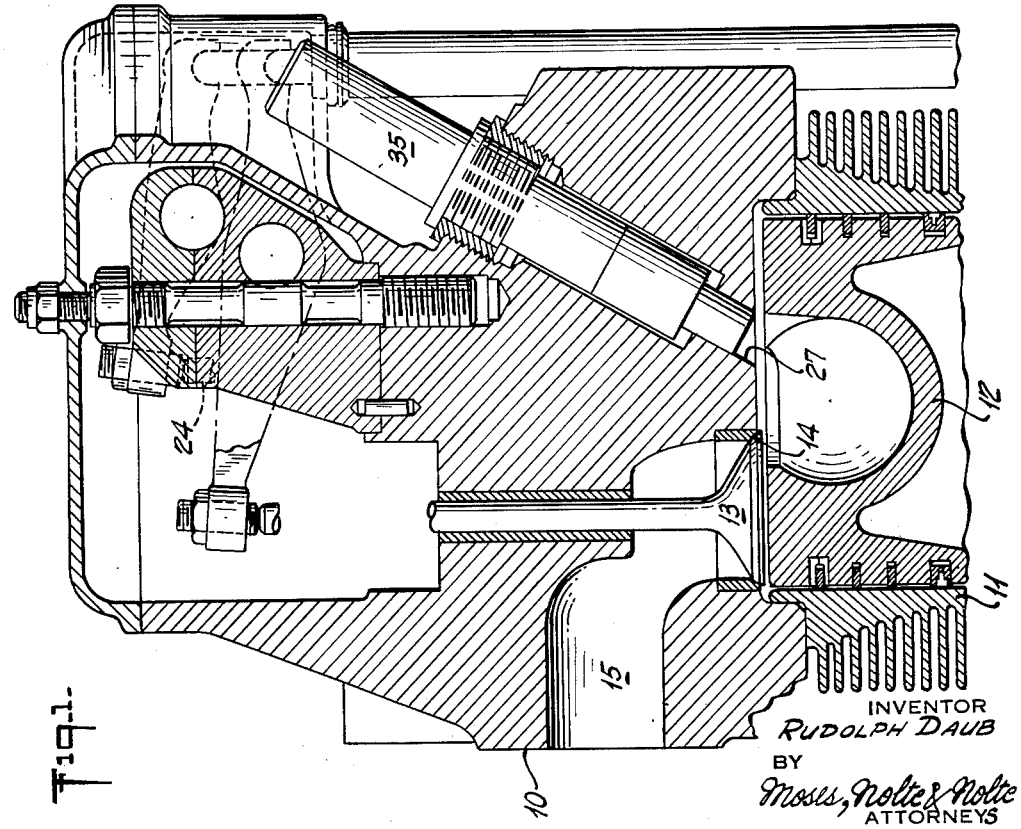
INVENTOR
RUDOLPH DAUB
BY
Moses, Nolte & Nolte
ATTORNEYS INVENTOR
RUDOLPH DAUB
BY
Moses, Nolte, & Nolte
ATTORNEYS

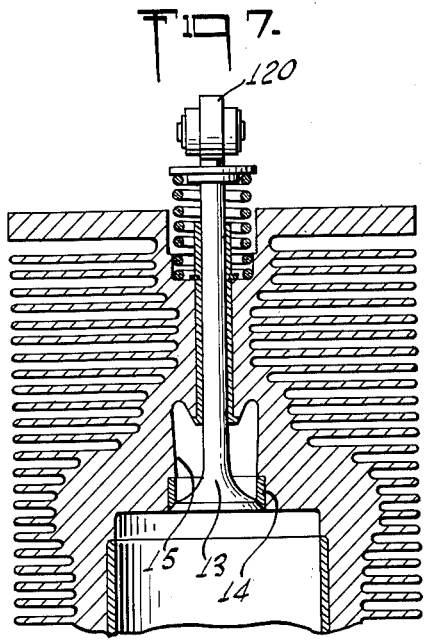
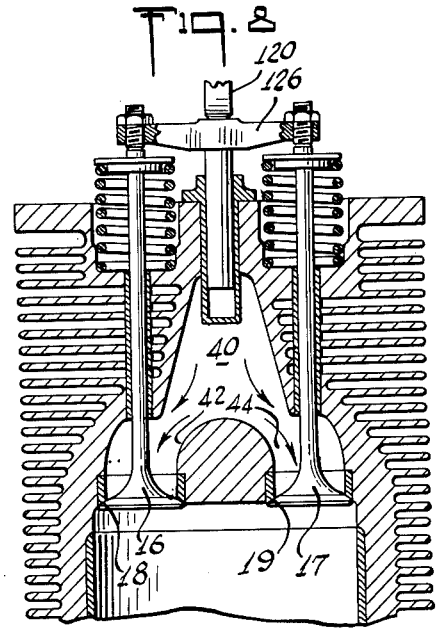
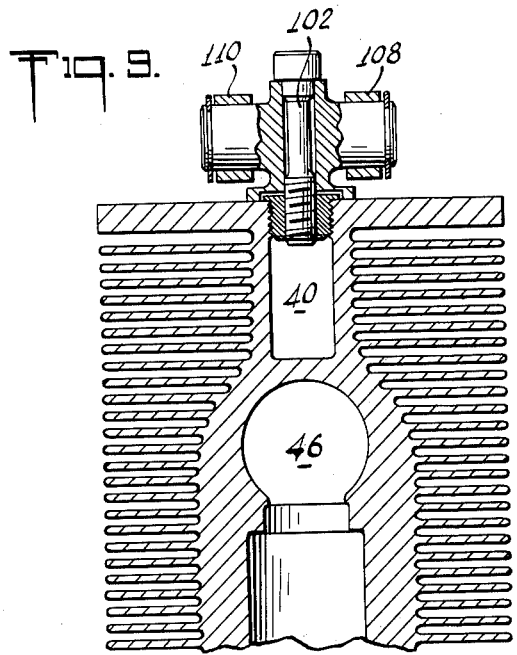

Oct. 2, 1962 R. DAUB 3,056,392
INTERNAL COMBUSTION ENGINES
Filed June 3, 1959 11 Sheets-Sheet 5

INVENTOR
RUDOLPH DAUB
BY
Moses, Nolte, & Nolte
ATTORNEYS

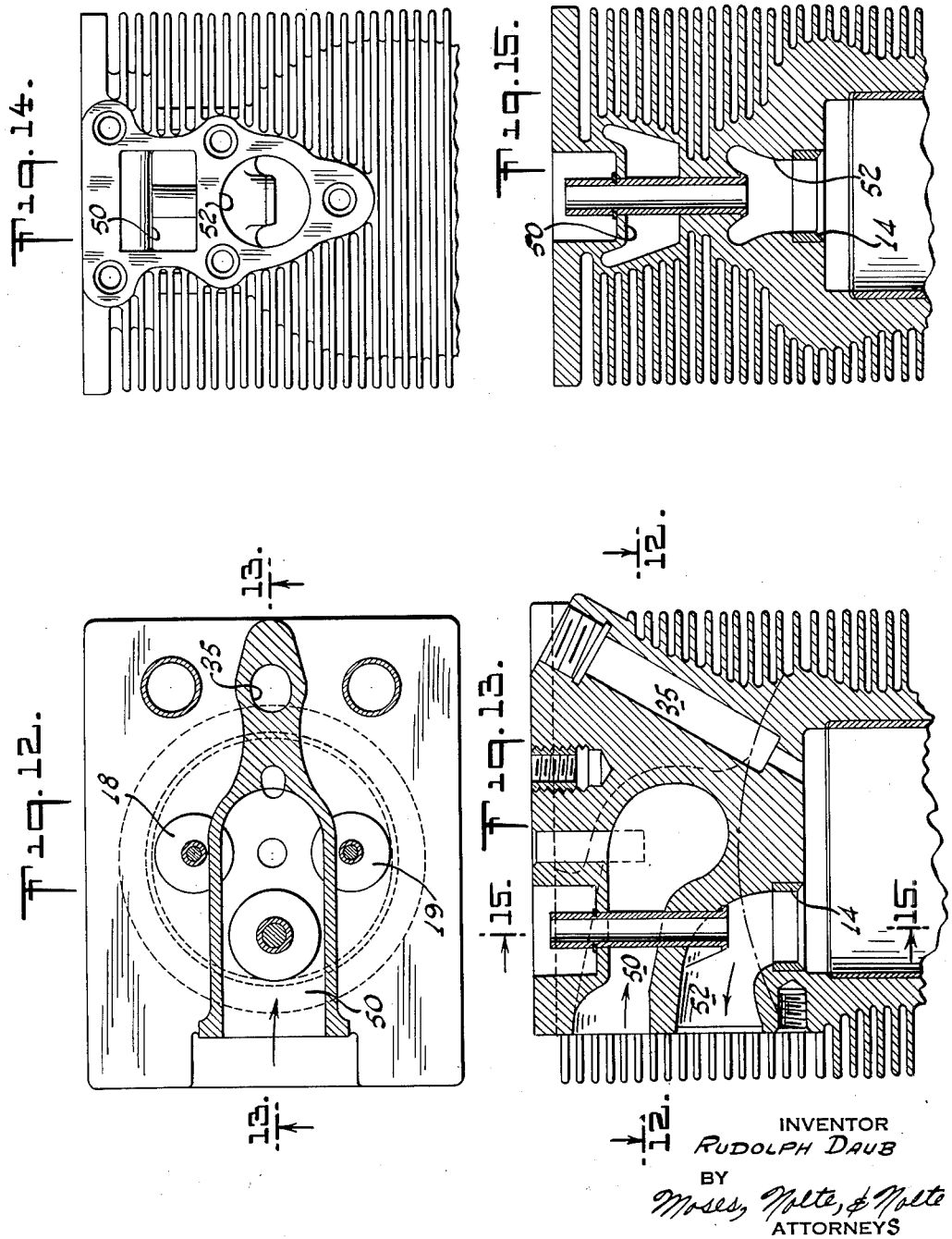

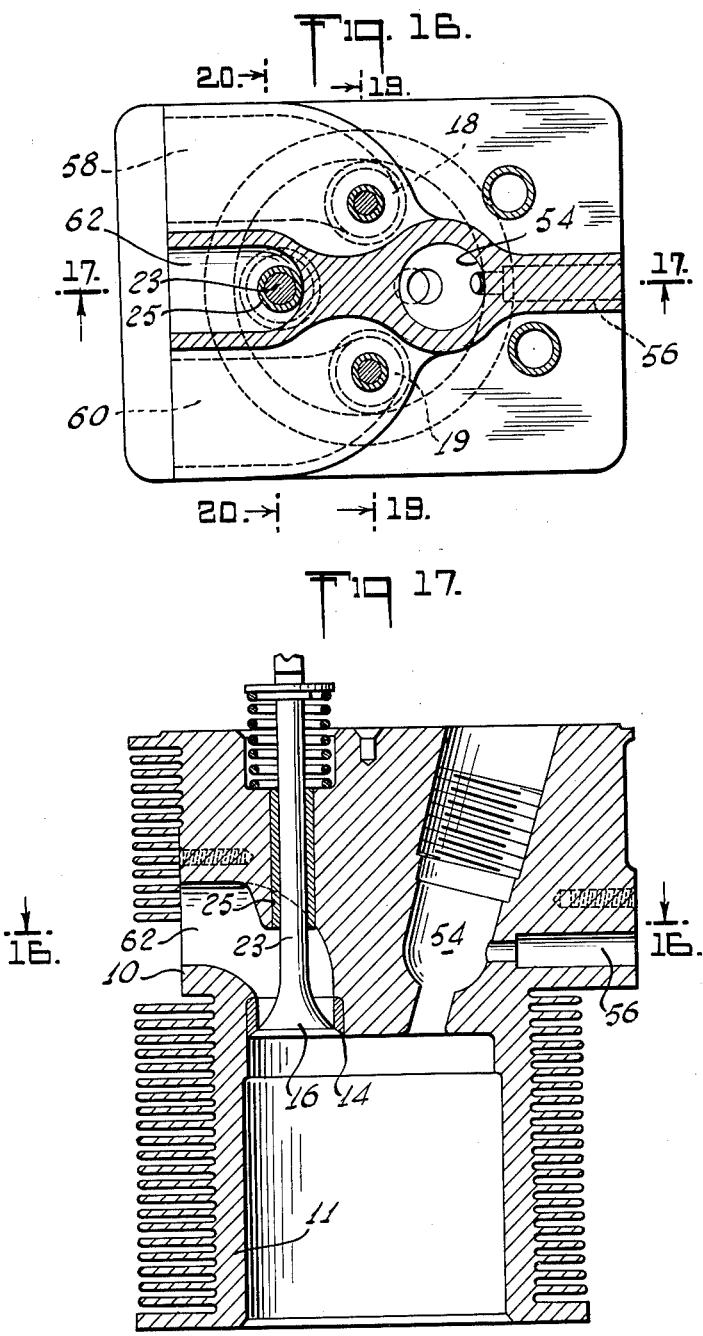

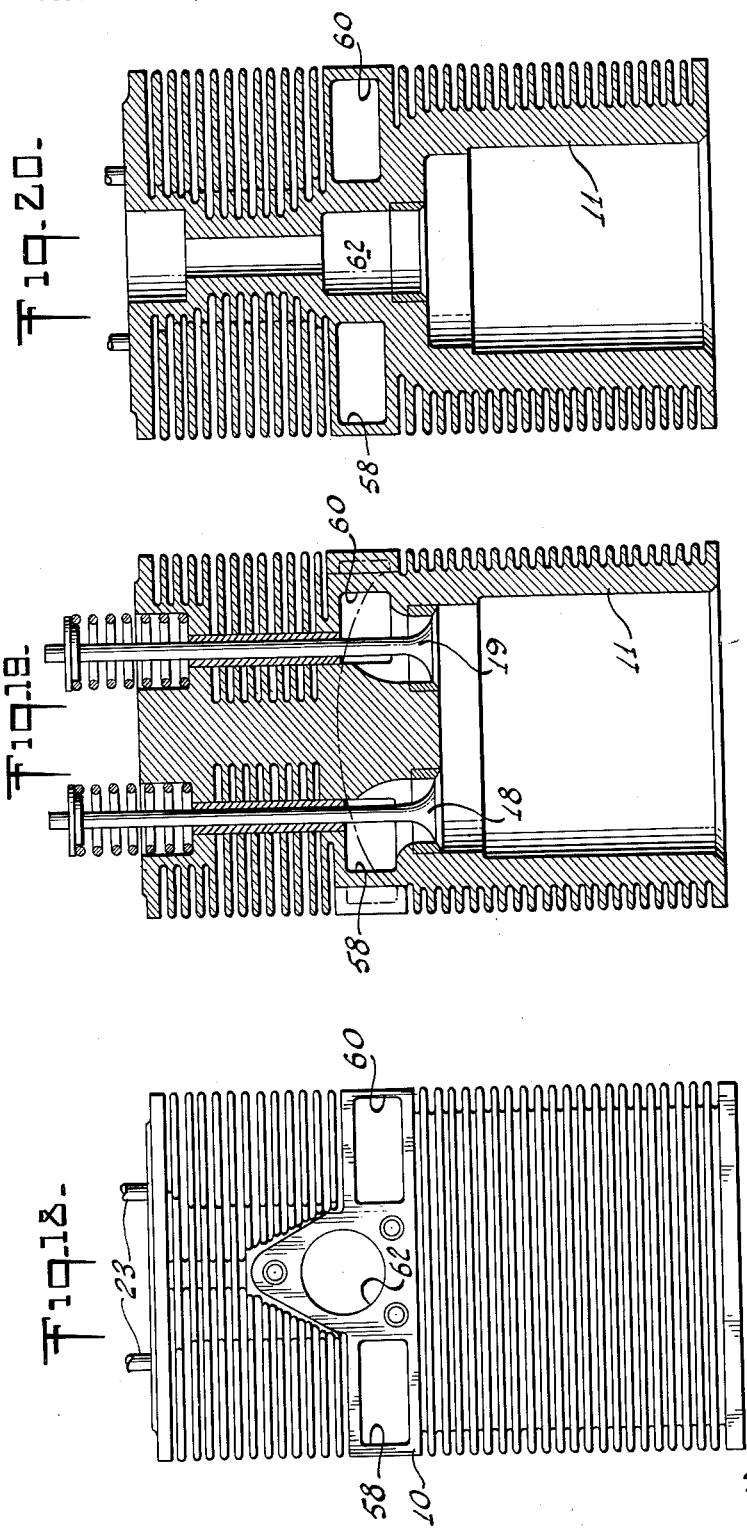

Oct. 2, 1962  R. DAUB  3,056,392
INTERNAL COMBUSTION ENGINES
Filed June 3, 1959  11 Sheets-Sheet 9

INVENTOR
RUDOLPH DAUB
BY
Moses, Nolte, & Nolte
ATTORNEYS

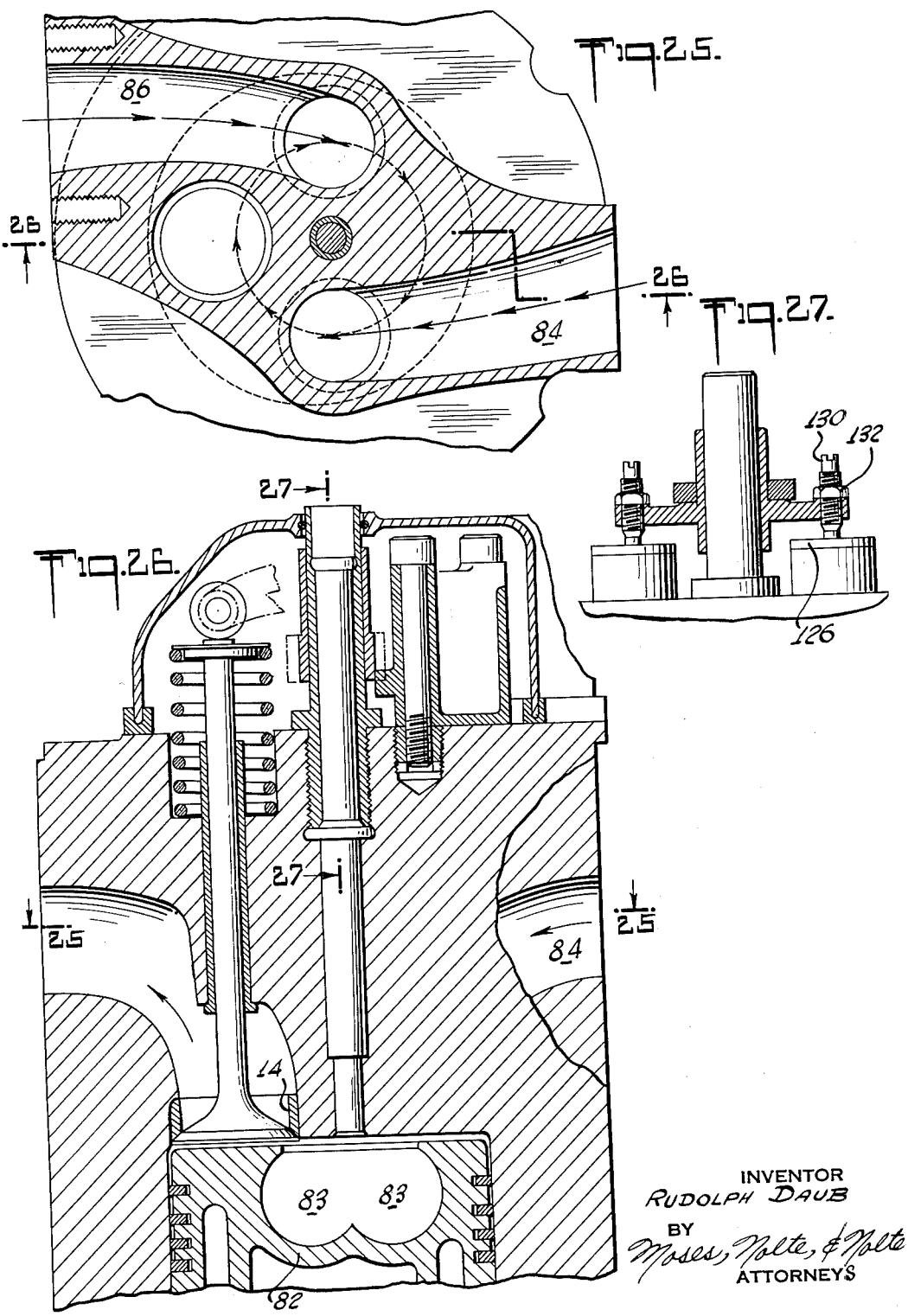

United States Patent Office 3,056,392
Patented Oct. 2, 1962

3,056,392
INTERNAL COMBUSTION ENGINES
Rudolph Daub, 88 Hillside Ave., West Caldwell, N.J.
Filed June 3, 1959, Ser. No. 817,920
32 Claims. (Cl. 123—32)

This application is a continuation-in-part of applicant's co-pending patent application 688,054, filed October 3, 1957, now abandoned.

This invention relates in general to internal combustion engines and in particular to new and useful internal combustion engine cylinder and head construction in which the various operating portions are arranged to effect operation with substantially uniform temperature distribution in the cylinder head area.

While the present invention has particular application in so-called Diesel engines, it is equally applicable to other types of internal combustion engines. In the operation of internal combustion engines it is usual to have areas of the cylinder head and the cylinder wall adjacent the head undergo great extremes of temperature. The areas adjacent the inlet valves are continuously cooled by incoming air while the areas adjacent the exhaust valves and the igniter are maintained at relatively high temperatures. In the usual engine construction these zones are closely spaced and not isolated to any extent so that during operation the temperature range of the parts in these areas varies over an extreme temperature range. These differences in temperature and the continual variation between high and low temperatures set up internal stresses in the parts of the cylinder and cause rapid wearing and malfunction of the engine.

In accordance with the present invention, the cylinder head is constructed, and the valve, injector and various parts are located, to provide somewhat isolated zones of temperature. A high temperature zone is maintained uniformly high along a central area throughout the engine operation, while low temperature zones are maintained at each side of the high temperature zone. This is accomplished generally by locating the normally high temperature parts such as an exhaust valve and an injector along a central diametric path along the cylinder head and by locating an inlet valve on each side of the central high temperature zone to maintain these areas at relatively low temperatures. The injector nozzle is advantageously located on the upstream side of the normal cooling air flow and the intake valves are located along a path at right angles to the air flow. Such a construction provides for ideal cooling as well as the maintenance of the uniform temperature zones, and materially lessens the stresses produced on the engine parts by excessive temperature conditions and variations of temperature.

In accordance with one embodiment of the invention there is provided a single exhaust valve and two equivalent area intake valves are provided instead of the usual one intake valve of large area. The two inlet valves are chosen to give approximately the same flow area as a larger single valve might produce, but by using two certain desirable conditions of temperature in the cylinder head are produced, and, in addition, the valves will last much longer because the seats will not wear out as rapidly on two valves as they would on a single valve. In a Diesel engine in particular, it is much more difficult to maintain the seating of an intake valve than an exhaust valve for example. An intake valve is advantageously located on each side of a high temperature zone defined by an exhaust valve on one side of the cylinder head and an igniter on the opposite side.

The inlet valve passages may be arranged to deliver inlet air from opposite directions, in which case a swirling motion of the inlet air may be produced in the cylinder. However, the inlet air may be delivered from a common direction and then divided at the center of the cylinder head to each of the diametric inlet ports.

A cylinder head formed in the manner outlined will operate for much longer periods than previous constructions due to the superior heat equalization throughout the cylinder head structure and the associated areas of the cylinder. In accordance with the invention there is little likelihood that there will be any extremes of temperatures either high or low on any of the critical areas of the head or cylinder. The central area of the head and the cylinder will be maintained at uniform high temperatures while the side areas in the vicinity of the intake valves will be maintained at relatively low temperatures throughout the operation of the internal combustion engine. Because an inlet valve is located on each side of the high temperature zone the dissipation of heat from the high temperature zone to these low temperature zones is greatly improved and is much more rapid than in previous engine constructions.

In accordance with another feature of the invention, cooling fins are provided which extend into the valve areas of the head and project deeply into the cylinder head casting. This is accomplished by eliminating the valve guide bosses and positioning the valves within the cooling fin areas in order to expose them directly to the cooling air flow over the fin areas. Since the bosses for the valve guides are eliminated there is no appreciable restriction of cooling air flow by such bosses, and hence, the operating parts are cooled before any excessive high temperatures can be generated.

In accordance with another feature of the invention, there is provided a high temperature zone of the aforementioned general character and including a recessed piston construction which in effect forms a flow area in the cylinder away from the exhaust valve as the piston rises on an exhaust stroke. This air flow creates an air quenching area in the vicinity of the hot portions of the engine. In one such embodiment the quenching area is located in the hot zone adjacent the exhaust valve while in the other embodiment the quenching area defined on the piston is located within the hot zone adjacent the igniter. In each case the piston recess causes a turbulence within the cylinder in the vicinity of the high temperature zone in order to cause a flow of cooling air over the parts and a subsequent high rate of heat transfer and reduction of temperature.

In accordance with still another embodiment of the invention, there is provided a cylinder head construction with the usual high temperature zone, extending diametrically across the cylinder and including one or more injectors or spark plugs located in the cool zone on opposite sides of the high temperature zone. Such a construction is particularly adaptable for heavy duty engine application and permits the maintenance of the uniform temperature areas as in the other embodiments.

Another feature of the invention is the provision of an improved rocker arm assembly permitting operation of an exhaust valve which is aligned in a high temperature zone extending across the cylinder and the operation of a pair of intake valves which are arranged on each side of the high temperature zone. The arrangement includes a duplex bearing boss upon which each of the rocker arms are mounted.

Accordingly, it is an object of this invention to provide a cylinder head construction for an internal combustion engine wherein the valve ports are arranged to provide for uniform temperature distribution in the cylinder head.

A further object of the invention is to provide an improved cylinder head construction including a high temperature zone maintained across the center of the cylinder head by the location of the exhaust port and injector, and a relatively cool zone defined by intake ports on each side of said high temperature zone.

A further object of the invention is to provide a cylinder head construction including separated temperature zones one of which is defined by an exhaust port and one of either of an igniter or pre-combustion chamber and the other zone being defined by inlet ports.

A further object of the invention is to provide a cylinder head construction including various arrangements and locations of inlet valves and an exhaust port to define a high temperature area extending across the cylinder and relatively low temperature areas on each side thereof.

A further object of the invention is to provide a cylinder head and cylinder construction in which a high velocity quench zone is defined by the piston configuration in a portion of the high temperature area.

A further object is to provide an improved cylinder head rocker arm mechanism.

A further object of the invention is to provide a cylinder head construction which is simple in design, rugged in construction, and economical to manufacture.

The various features of novelty are pointed with particularity in the claims annexed to and forming this specification. For a better understanding of the invention, its operating advantages and specific objects attained by its use, reference should be had to the accompanying drawing and descriptive matter in which there are illustrated and described preferred embodiments of the invention.

In the drawings:

FIG. 1 is a vertical section of a cylinder head and cylinder taken on the line 1—1 of FIG. 3 and constructed in accordance with the invention;

FIG. 2 is a horizontal section taken on the line 2—2 of FIG. 3;

FIG. 7 is a vertical section taken on the line 7—7 of FIG. 5;

FIG. 8 is a vertical section taken on the line 8—8 of FIG. 5;

FIG. 9 is a vertical section taken on the line 9—9 of FIG. 5;

FIG. 12 is a horizontal section taken on the line 12—12 of FIG. 13 and indicating another embodiment of the invention;

FIG. 13 is a horizontal section taken on the line 13—13 of FIG. 12;

FIG. 14 is a left end elevation of the cylinder head indicated at FIG. 12;

FIG. 15 is a vertical section taken on the line 15—15 of FIG. 13;

FIG. 16 is a horizontal section taken on the line 16—16 of FIG. 17 and indicating another embodiment of the invention;

FIG. 17 is a vertical section taken on the line 17—17 of FIG. 16;

FIG. 18 is an end elevation of the embodiment indicated in FIG. 16;

FIG. 19 is a vertical section taken on the line 19—19 of FIG. 16;

FIG. 20 is a vertical section taken on the line 20—20 of FIG. 16;

FIG. 25 is a fragmentary horizontal section taken on the line 25—25 of FIG. 26 of another embodiment of the invention;

FIG. 26 is a vertical section taken on the line 26—26 of FIG. 25; and

FIG. 27 is a fragmentary vertical section taken on the line 27—27 of FIG. 26.

Figure 3:
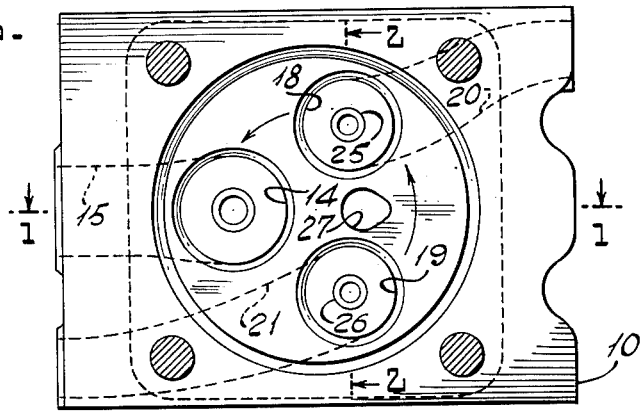
FIG. 3 is a bottom view of the cylinder head portion of FIGURE 1.

Referring to the drawings in particular the invention as embodied therein includes a cylinder head generally designated 10 which is seated on a cylinder block 11. A piston 12 is adapted to reciprocate within the cylinder block 11 in the usual manner. An exhaust valve 13 is shown seated in an exhaust port 14 which is in communication with an exhaust outlet passage 15. A pair of inlet valves 16 and 17 are seated in their respective ports 18 and 19, which are in communication with the inlet passages 20 and 21, respectively. The inlet and exhaust valves are actuated by improved rocker arm mechanisms to be described more fully hereinafter.

Cooling fins 22 are advantageously made substantially parallel and arranged with suitable baffling (not shown) to be positioned in the cooling air flow and permit the flow of such cooling air over the fin structure in a given direction. The cooling fins 22, as indicated in FIG. 2, project deeply into the cylinder head casting 10 well beyond the bore holes for valve stem 23 and 24 of the valves 16 and 17, respectively. In order to provide guide means for the valve stems, sleeves 25 and 26 are placed in the casting surrounding the valve stems. It can be appreciated that without the valve stem guides 25 and 26 accurate valve alignment cannot be readily achieved without bosses on the upwardly slanting fin portions 22 of the cylinder head 10. By the present construction such bosses are eliminated and hence the casting is greatly simplified, permitting the fins to extend beyond the locations of the valves and permitting substantially uninterrupted flow of air around the valve guide surfaces and substantially better heat transfer.

Referring specifically to FIG. 3, the inlet valve ports 18 and 19 are located diametrically opposite one another in the cylinder head, and the exhaust port 14 and the igniter opening 27 located along a path extending centrally across the cylinder head and between the inlet valve ports. The arrangement is such that the igniter opening 27 and the exhaust port 14 are arranged in a path displaced approximately ninety degrees from the path extending between the inlet ports. As can be appreciated, the exhaust gases necessarily heat the exhaust port portion of the cylinder head during the expulsion of gases from the cylinder. Also, a hot spot will appear in the cylinder head near the igniter opening, while two cooled portions of the cylinder head will result from the entrance of the cool air through the inlet valve ports at the locations of the ports. By keeping the hot and cool spots diametrically opposed in accordance with the present invention, a uniform temperature of the cylinder head is achieved. Consequently, less internal stress through temperature variation is produced in the cylinder head.

Figure 4:
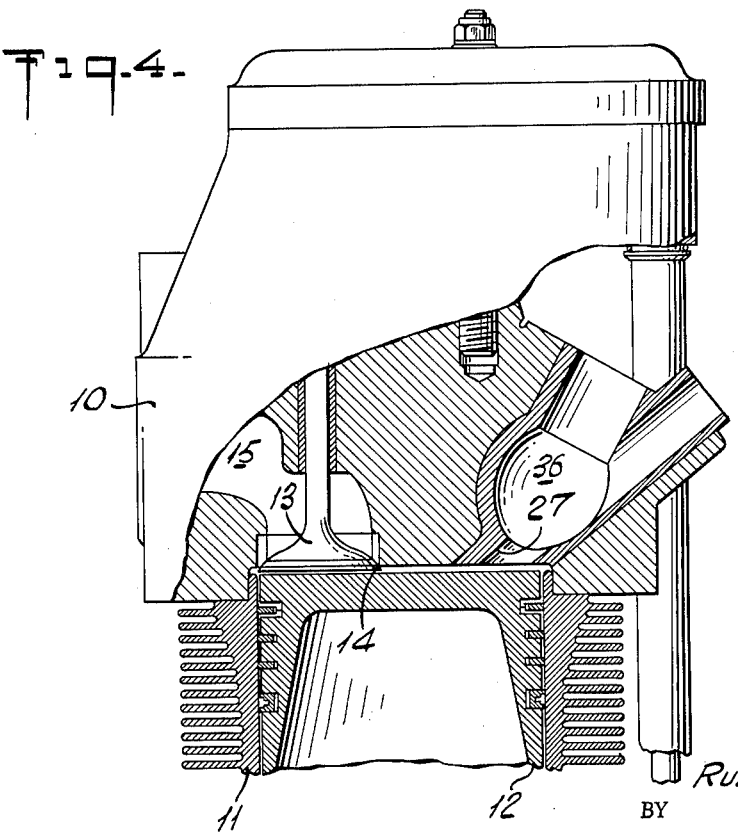
FIG. 4 is a partial elevation and partial section similar to FIG. 1 of another embodiment of the invention.
Figure 5:
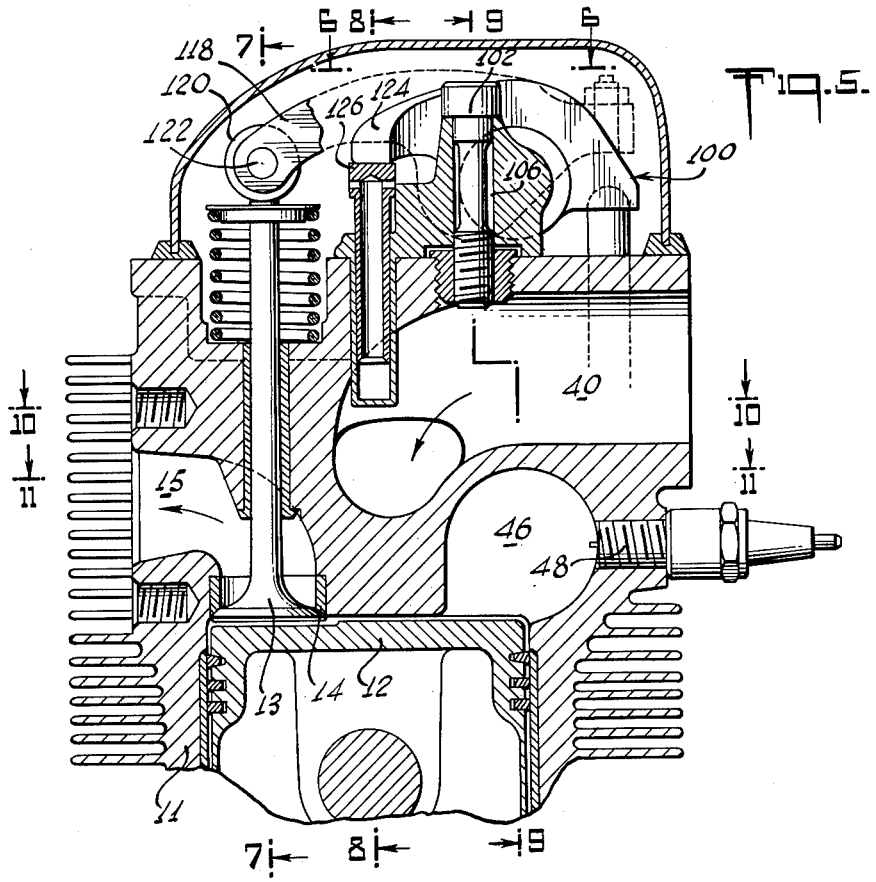
FIG. 5 is a vertical section taken on the line 5—5 of FIG. 6 of still another embodiment of the invention.

It should be appreciated that the functionings of the opening 27 may change in accordance with the type of, or system of, combustion and the type of engine with which the system is used. For example, in the embodiment illustrated in FIGS. 1–3, the engine is a Diesel engine in which the opening 27 is provided to accommodate fuel injector 35. In an automotive type engine this, of course, would be replaced by a spark plug. In FIG. 4 a pre-combustion chamber 36 is formed in a cylinder head and this may accommodate a fuel injector at the upper end thereof, and a glow plug in such instances where such plugs are used.

In the embodiment illustrated in FIGS. 1–3 the inlet passages 20 and 21 are arranged to cause the inlet air to enter the cylinder substantially tangentially and swirl around the cylinder in the direction of the arrows as shown in FIG. 3. This swirling motion effects a better mixing of the fuel and the incoming air to effect increased engine efficiency.

In FIGS. 5 to 11 inclusive there is another embodiment of the invention in which similar parts of the cylinder head and cylinder and the associated mechanisms are similarly designated. In this embodiment there is a single inlet passage 40 which is arranged in the cooling air flow stream and which communicates with laterally extending passages 42 and 44 which connect inlet ports 18 and 19. As in the previous construction the cylinder head includes a plurality of fins 46 all of which are substantially parallel and arranged in the airflow path. The inlet valves 16 and 17 in this embodiment are also located in a line extending across the normal cooling air path (indicated in FIGS. 10 and 11 by arrows). Also in this embodiment the cylinder head is constructed with the fins extending inwardly beyond the inlet valve guide holes in order to provide adequate cooling around the entire circumference of the valve and inwardly toward the center high temperature zone of the cylinder head. As in the previous embodiment, openings are formed through the fins to accommodate the valve sleeves 25 and 26 to guide the valves in their reciprocating movement.

In the embodiment indicated in FIGS. 5 to 11, as in the previous embodiment, the high temperature zone of the cylinder head is defined across the head between each of the intake valves 16 and 17. The zone is maintained at high temperatures by the usual operation of the exhaust valve 13 in handling the high temperature exhaust gases and by ignition in a pre-combustion chamber 46. The chamber 46 is provided with an ignition plug 48 to explode a fuel and air mixture which is swirled within the pre-combustion chamber by the upward movement of the piston 12. In this embodiment the high temperature zone formed across the cylinder head in alignment with the exhaust valve and the pre-combustion chamber and on each side of the intake valves is cooled by a combination of many cooling actions. Incoming air which is directed through the intake passage 40 will conduct away a large portion of the heat which is generated in the area of the exhaust valve and the pre-combustion chamber 46. In addition, a normal air flow which is directed over the cylinder head will conduct away a large portion of the heat on each side of the high temperature zone.

In FIGS. 12 to 15 there is indicated still another embodiment of the invention in which a high temperature zone is formed across the cylinder by the location of the injection nozzle 35 and the exhaust port 14. In this embodiment an inlet passage 50 and an exhaust passage 52 are located on the same side of the cylinder head. Inlet air flows into the inlet passage 50 and splits at the center and flows to each side into ports 18 and 19 respectively. In this arrangement intake and exhaust passages 50 and 52 are closely adjacent and the incoming inlet cooling air maintains the high temperature zone in a cooled condition.

In the embodiments illustrated in FIGS. 16 to 20 the high temperature zone extending across the cylinder head is formed by the location of the exhaust port 14 and by the location of a pre-combustion chamber 54 which may be advantageously provided with a glow plug located in a cavity 56 defined within the cylinder head. In this embodiment two inlet passages 58 and 60 are located on each side of a central exhaust passage 62. Inlet air flow is around each side of the exhaust passage 62 and through the associated inlet ports 18 and 19. Cooling air flow may be provided to flow in accordance with the arrow as indicated in FIG. 16, or if desired, the complete unit may be jacketed for liquid cooling.

Figure 21:
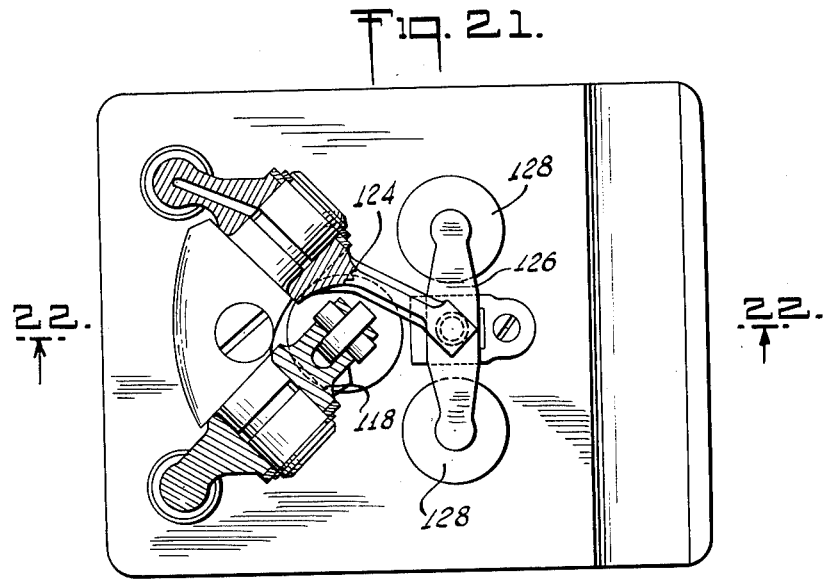
FIG. 21 is a vertical section taken on the line 21—21 of FIG. 22 of another embodiment of the invention.
Figure 22:
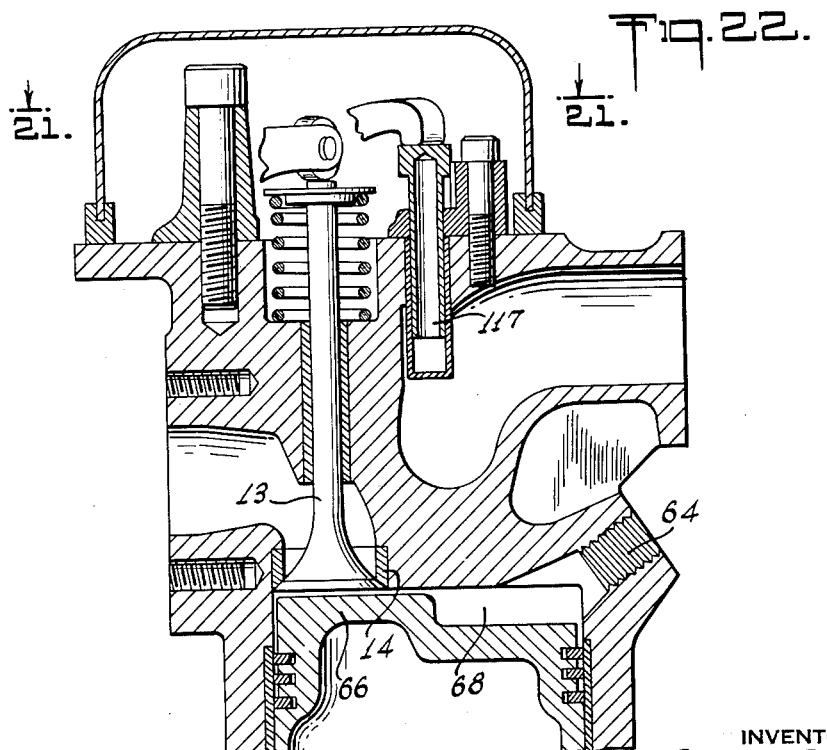
FIG. 22 is a vertical section taken on the line 22—22 of FIG. 21.

In the embodiment illustrated in FIGS. 21 and 22, the high temperature zone is formed by the location of an exhaust port 14 and by a cavity 64 for receiving a glow plug, spark plug or igniter. In accordance with this embodiment of the invention a cylinder 66 is provided which has a recessed area 68 defined in the top surface of the head subjacent to and in alignment with the high temperature zone created by the location of the exhaust port 14 and the igniter 64. An exhaust passage 63 is defined in one side of the cylinder head while an inlet passage 65 is defined in the other side similar to the embodiment shown in FIGS. 5 to 11.

Upward movement of the piston 66 during an exhaust stroke causes rapid flow and swirling of the exhaust gases first outwardly through the exhaust port after it is opened and then downwardly into the cavity 66 as the piston approaches the top of its stroke. This causes a turbulent swirling motion of the gases in the high temperature area and a quenching of the metal parts by transferring heat out through the exhaust port 14 along with the exhaust gases.

Figure 23:
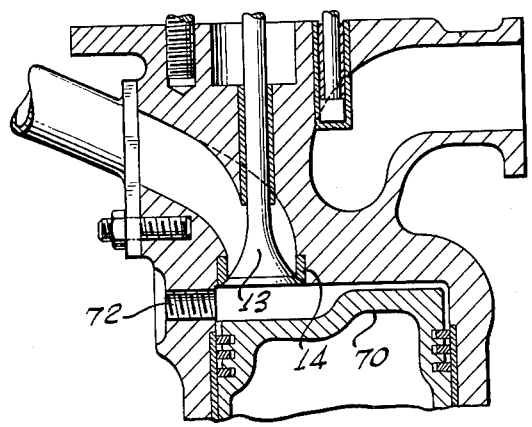
FIG. 23 is a vertical section similar to FIG. 22 of another embodiment of the invention.

An alternate arrangement of this construction is indicated in FIG. 23 in which a piston 70 is provided with a cavity 72 formed in the top surface thereof subjacent to the high temperature zone but on the opposite side of the piston head from that indicated in FIGS. 21 and 22. In this latter embodiment the high temperature zone is localized on one side of the cylinder head by the positioning of the exhaust port 14 and a cavity 74 to receive an igniter element (not shown). The turbulent flow conditions set up by the cavity 74 in the area of high temperature causes a quenching action at these locations and rapid dissipation of the heat. In each of the embodiments illustrated in FIGS. 21 to 23, the cylinder head construction is similar to that of the other embodiments in respect to the provision of cooling fins and the isolation of the high temperature zone from the normal cooler temperature zone areas of the cylinder head.

Figure 24:
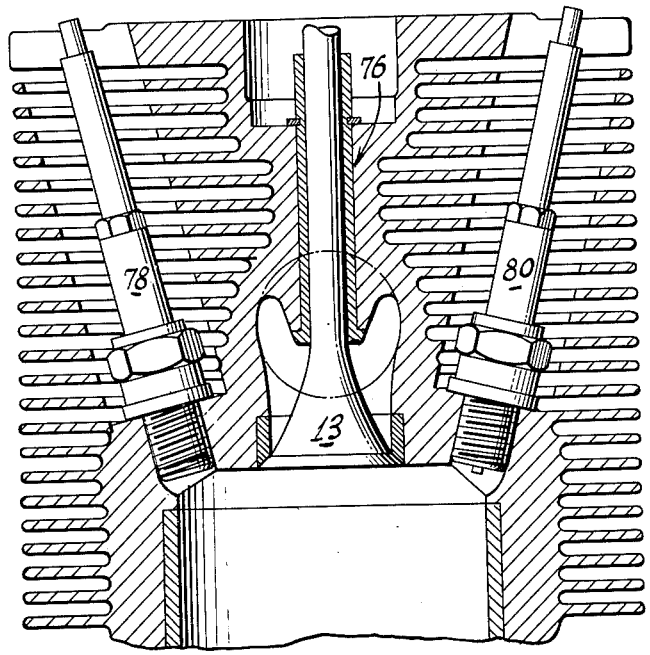
FIG. 24 is a vertical section of still another embodiment of the invention.

In FIG. 24 there is illustrated another embodiment of cylinder head construction in which a high temperature zone generally designated 76 is defined along a central diameter of the cylinder head by one or more of the elements including an exhaust valve port 14 enumerated in the other embodiments. In this embodiment beside the location of an inlet valve (not shown) on each side of the high temperature zone 76 there is provided cavities to receive two spark plugs 78 and 80 located in the normally cool zones of the cylinder head construction. This latter construction is for heavy duty units in which the area of high temperatures maintained in the top of the cylinder is extended laterally from the normal high temperature zone. One of the spark plugs may be advantageously replaced by a fuel injector if the operating conditions of the engine are such to require it.

In FIGS. 25 to 27 inclusive there is illustrated still another embodiment of the invention in which a high temperature zone is defined by an exhaust port 14 and including a piston 82 having two connecting spherical cavities 83, 83 formed centrally in the upper face thereof and including inlet passages 84 and 86 which extend inwardly from opposite sides of the cylinder head and are arranged to direct incoming air tangentially into the cylindrical cavities 83, 83 as indicated in FIG. 25. The shape of the cavity 83 is such that the air is given a high velocity whirling motion to effect intermixing of the products of combustion on the uptake stroke of the piston 82 drawing the compression stroke of the piston and to whirl the exhaust gases to cool the parts during the exhaust stroke.

Figure 6:
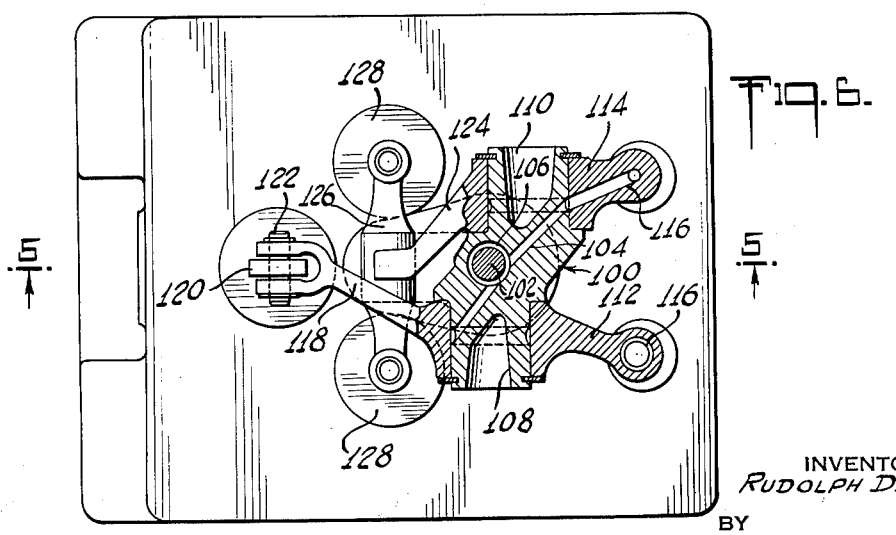
FIG. 6 is a horizontal section taken on the line 6—6 of FIG. 5.
Figure 10:
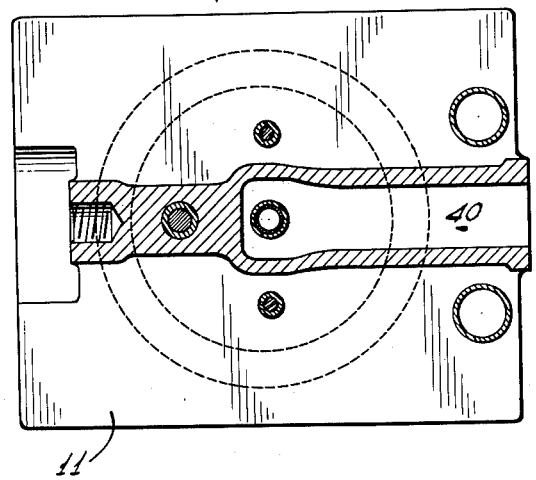
FIG. 10 is a horizontal section taken on the line 10—10 of FIG. 5.
Figure 11:
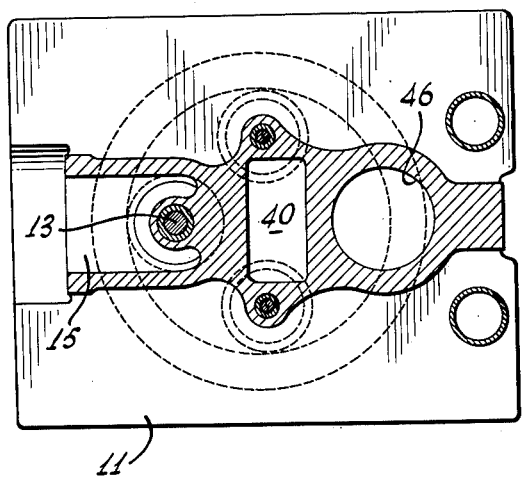
FIG. 11 is a horizontal section taken on the line 11—11 of FIG. 5.

In order to provide the advantageous distribution of temperatures in the cylinder head of the present invention, there is provided a novel valve actuating mechanism which is best indicated in FIGS. 6, 21 and 27. In FIG. 6 the arrangement is such that the intake valves are located adjacent the rocker arm mechanism and in FIG. 21 the intake valves are located on the other side of the exhaust valve in relation to the rocker arm mechanism. The rocker arm mechanism includes a central duplex supporting boss generally designated 100 which is mounted on an upstanding rod member 102 and is internally drilled to provide passages 104 which communicate with a hollow bore 106 thereof. The bore 106 is arranged to receive lubricating oil under pressure for direction through the passages 104 to the remaining operating parts of the rocker arm mechanism.

The duplex boss 100 is provided with a cylindrical bearing portion 108 at one side and a cylindrical bearing portion 110 on the opposite side, each adapted to receive associated crank members 112 and 114 respectively. Each of the crank members includes an arm 116 which is actuated by a push rod (such as rod 117 in FIG. 22) in response to a cam in a known manner to rock the rocker arms 112 and 114 about the cylindrical portions 108 and 110 respectively. The rocker arm 112 is provided with an exhaust valve operating arm 118 which includes a yoke portion which is secured to an upstanding member 120 of the exhaust valve 13 by a pin 122.

The intake rocker arm 114 includes an intake arm 124 which is connected to a yoke member 126 having laterally extending portions which are connected to disc members 128 located above each inlet valve. In the embodiment indicated in FIGS. 21, 22 and 27, the intake arm 124 is longer than the exhaust arm 118 and the contrary is true in FIG. 6. The clearance between the yoke member 126 and the disc members 128 may be adjusted by turning a threaded contact member 130 in its associated nut 132 (FIG. 27). The novel rocker arm assembly mechanism permits the variations of intake and exhaust port locations and arrangements while permitting effective operation of the associated valve.

The invention provides an engine which may operate effectively over long periods of time without excessive engine wear due to the usual operating high temperatures. The unique cylinder head construction provides for heat equalization throughout the construction and permits operation at lower temperatures and without excessive temperature peaks at critical areas on a cylinder head and the cylinder.

While specific embodiments of the invention have been shown and described in detail to illustrate the application of the invention principles, it will be understood that the invention may be embodied otherwise without departing from such principles.

I claim:

1. In an air cooled internal combustion engine having a cylinder block and a cylinder head, the improvement comprising an elongated rib forming a high temperature zone defined across said cylinder head diameter by an exhaust port and a combustion area, and passage means for directing inlet air into said cylinder on each side of said high temperature zone.

2. In an air cooled internal combustion engine having a cylinder block and a cylinder head the improvement which comprises an elongated rib forming a high temperature zone extending across said cylinder head diameter, said rib including an exhaust port and means for initiating combustion in said zone, and inlet means spaced laterally on each side of said rib.

3. A cylinder head for an air cooled internal combustion engine comprising a casting including holes extending through said casting from a top portion thereof through the bottom portion thereof, said bottom portion being adapted to be positioned on a cylinder head, said holes being provided to accommodate a pair of intake valves and an exhaust valve, said casting having a plurality of substantially parallel fins formed thereon by a plurality of slots extending inwardly into the casting to a depth greater than the holes provided for said intake valves, said slots inwardly terminating to define an elongated rib portion extending across said cylinder head diameter, and sleeve guides for said valves extending into said holes.

4. A cylinder head construction for an overhead valve type air cooled internal combustion engine comprising a head having a pair of substantially diametrically opposed inlet ports defined therein, a substantially solid central rib extending across the head diameter arranged between said inlet ports, said rib forming an exhaust port and a high temperature combustion initiation area defined in said head located substantially in diametrically opposed relationship but spaced ninety degrees from said inlet ports, said head having bores defining valve stem guide openings in alignment with said inlet and exhaust ports, a plurality of cooling fins defined in said head extending outwardly from the central rib thereof around and beyond the inlet valve bores, and a valve guide sleeve positioned in each of said valve guide bores in contact with said cooling fins.

5. A cylinder head according to claim 4, wherein said high temperature area of said cylinder is an igniter.

6. A cylinder head according to claim 4, wherein said high temperature area of said cylinder is a pre-combustion chamber defined in said head.

7. A cylinder head according to claim 4, wherein said head includes oppositely extending inlet passages communicating with said inlet ports and arranged to deliver inlet air into said cylinder substantially tangentially thereto to effect a swirling motion of the inlet air.

8. An air cooled cylinder head construction for an overhead valve type internal combustion engine comprising a head having an elongated rib central high temperature zone extending across the head diameter defined by means for exhausting gases and means for effecting combustion of said gases in an associated cylinder spaced along said zone, and inlet means diametrically opposed on each side of said high temperature zone.

9. A cylinder head construction according to claim 8, wherein said inlet means include wall means defining passages in said head extending inwardly from opposite sides of said head.

10. A cylinder head construction according to claim 8, including wall means defining an inlet passage extending inwardly from one side of said head and including passage means extending laterally on each side of said high temperature zone.

11. A cylinder head construction according to claim 8, including wall means defining an inlet passage on the same side of said head as said exhaust means, and passage means for effecting intake of air along said high temperature zone and then laterally on each side of said zone.

12. A cylinder head construction according to claim 8, wherein said inlet means includes wall means defining separate inlet passages of each said high temperature zones on a common side of said cylinder head.

13. A cylinder head construction according to claim 8, wherein said high temperature zone includes a built up wall area having a cavity defined therein, said cavity being in communication with the lower face of said head whereby to define a pre-combustion chamber.

14. An air cooled internal combustion engine comprising a cylinder block, a cylinder head covering said cylinder block, a piston reciprocable within said cylinder, a high temperature zone defined across said cylinder and said cylinder head, said zone being defined by a substantially solid rib portion extending upwardly in a central plane across the diameter of said cylinder head, said zone including means for exhausting gases from said cylinder and means for initiating combustion in said cylinder, and cooling fin means extending outwardly on each side of said rib portion.

15. An internal combustion engine according to claim 14, wherein said means for initiating combustion includes an injector.

16. An internal combustion engine according to claim 14, wherein said means for initiating combustion includes spark means.

17. An internal combustion engine according to claim 14, wherein said piston is provided with a recessed area extending across said high temperature zone whereby to provide whirling of gases in said area and quenching of said high temperature zone.

18. An internal combustion engine according to claim 17, wherein said recessed area in said piston is located subjacent said ignition means.

19. A cylinder head construction for an overhead valve air cooled internal combustion engine comprising, a head having a pair of substantially diametrically opposed inlet valves defined therein, a substantially solid central rib extending across the head diameter, an exhaust valve and a combustion initiation area defined in said rib and substantially in diametrically opposed relationship and located between and separating said diametrically opposed inlet valves, said rib having an enlarged upper surface, said head having bores defining valve stem guide openings in alignment with said inlet and exhaust valves, and a valve guide sleeve positioned in each of said valve stem guide openings in contact with said cylinder head and said valve stems.

20. A cylinder head construction according to claim 19, comprising in addition, rocker arm securing means in said upper platform surface of said central beam portion.

21. A cylinder head construction according to claim 20, wherein said central beam portion includes an intake opening and further includes a portion bifurcating said intake opening to provide passageways to each of said diametrically opposed inlet valves.

22. A cylinder head construction according to claim 19, wherein said valve guide sleeves are positioned in parallel relation.

23. A cylinder head construction according to claim 19, comprising in addition, a plurality of cooling fins extending inwardly from said head outer periphery about and beyond said intake valve stem bores and inwardly terminating to define said central rib containing said exhaust valve and said combustion initiation area.

24. A cylinder head construction according to claim 19, wherein said central rib is provided with passageways leading to said diametrically opposed inlet valves.

25. A cylinder head construction for an overhead valve type air cooled internal combustion engine comprising a head having a pair of substantially diametrically opposed inlet ports defined therein, an exhaust port of a high temperature area defined in said head and located substantially in diametrically opposed relationship but displaced 90° from said inlet ports, said head having bores defining valve stem guides in alignment with said inlet and exhaust ports, a plurality of cooling fins defined in said head extending outwardly from the central portion thereof around and beyond said valve guide bores, and a valve guide sleeve positioned in each of said valve guide bores in contact with said cooling fins.

26. A cylinder head according to claim 25, wherein said high temperature area of said cylinder is an igniter.

27. A cylinder head according to claim 25, wherein said high temperature area of said cylinder is a precombustion chamber defined in said head.

28. A cylinder head according to claim 25, wherein said head includes oppositely extending inlet passages communicating with said inlet ports and arranged to deliver inlet air into said cylinder substantially tangentially thereto to effect a swirling motion thereof.

29. A cylinder head construction for an air cooled overhead valve internal combustion engine comprising, a head having a pair of substantially diametrically opposed inlet valves defined therein, an exhaust valve, a central beam extending substantially across the diameter of said cylinder head, said intake valves disposed on opposite sides of said central beam and said exhaust valve located at one end of said central beam.

30. An air cooled cylinder head structure comprising a combustion chamber enclosing crown, a rocker bracket supporting platform, an elongated beam extending across the diameter of said head structure connecting said crown to said platform, intake valve openings in said crown located substantially diametrically opposed and on opposite sides of said beam, the center of said valve openings defining a line substantially at right angles to the long portion of said beam.

31. A cylinder head structure according to claim 30 including an exhaust valve opening located near one end of the elongated beam.

32. A cylinder head structure according to claim 31, including an igniter opening near the opposite end of the beam with a plane common to the exhaust opening center and igniter opening center substantially dissecting the center of said crown.

References Cited in the file of this patent

UNITED STATES PATENTS

| 1,977,127 | Guernsey | Oct. 16, 1934 |
| 2,269,104 | Hedlund | Jan. 6, 1942 |
| 2,416,866 | Bronander | Mar. 4, 1947 |
| 2,650,578 | Daub | Sept. 1, 1953 |

FOREIGN PATENTS

| 466,677 | Great Britain | June 2, 1937 |
| 597,807 | Great Britain | Feb. 4, 1948 |
| 900,899 | France | Oct. 23, 1944 |
| 136,762 | Australia | Mar. 20, 1950 |